(12) United States Patent
Bertz et al.

(10) Patent No.: US 9,154,949 B1
(45) Date of Patent: Oct. 6, 2015

(54) AUTHENTICATED DELIVERY OF PREMIUM COMMUNICATION SERVICES TO UNTRUSTED DEVICES OVER AN UNTRUSTED NETWORK

(71) Applicant: Sprint Communications Company L.P., Overland Park, KS (US)

(72) Inventors: Lyle T. Bertz, Lee's Summit, MO (US); Robert H. Burcham, Overland Park, KS (US); Robin D. Katzer, Olathe, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 178 days.

(21) Appl. No.: 13/937,191

(22) Filed: Jul. 8, 2013

(51) Int. Cl.
*H04M 1/66* (2006.01)
*H04W 12/06* (2009.01)

(52) U.S. Cl.
CPC ..................................... *H04W 12/06* (2013.01)

(58) Field of Classification Search
USPC ........................... 455/410–411, 432.1, 435.1, 455/414.2–414.3
See application file for complete search history.

(56) References Cited

U.S. PATENT DOCUMENTS

| | | | |
|---|---|---|---|
| 6,742,126 B1 | 5/2004 | Mann et al. | |
| 8,489,072 B1* | 7/2013 | Ding | 455/411 |
| 8,621,590 B2 | 12/2013 | Hoggan | |
| 8,754,765 B2* | 6/2014 | Berger et al. | 340/539.11 |
| 8,874,899 B1 | 10/2014 | Persson et al. | |
| 8,955,078 B2 | 2/2015 | Hoggan et al. | |
| 2002/0184235 A1 | 12/2002 | Young et al. | |
| 2006/0171390 A1 | 8/2006 | La Joie | |
| 2006/0272031 A1 | 11/2006 | Ache et al. | |
| 2007/0120965 A1 | 5/2007 | Sandberg et al. | |
| 2007/0136205 A1 | 6/2007 | Przybilla | |
| 2008/0109307 A1 | 5/2008 | Ullah | |
| 2008/0289025 A1 | 11/2008 | Schneider | |
| 2009/0249405 A1 | 10/2009 | Karaoguz et al. | |
| 2009/0249406 A1 | 10/2009 | Gordon et al. | |
| 2009/0249413 A1 | 10/2009 | Karaoguz et al. | |
| 2009/0249422 A1 | 10/2009 | Chen et al. | |
| 2009/0249424 A1 | 10/2009 | Gordon et al. | |
| 2009/0298514 A1 | 12/2009 | Ullah | |
| 2010/0172253 A1 | 7/2010 | Morita | |
| 2010/0235550 A1 | 9/2010 | Bolton et al. | |
| 2010/0284668 A1 | 11/2010 | Knight | |

(Continued)

OTHER PUBLICATIONS

Pre-Interview Communication dated Mar. 23, 2015, U.S. Appl. No. 13/937,193, filed Jul. 9, 2013.

(Continued)

*Primary Examiner* — Brandon Miller

(57) ABSTRACT

A method of authenticating a communication device for accessing premium communication services via an untrusted network. The method comprises receiving a request message from a communication device, wherein the request message comprises an identification of a delegated premium service delivery service and a mobile directory number of a mobile communication device, wherein the mobile communication device is different from the communication device. The method further comprises transmitting a code word to the mobile communication device associated with the mobile directory number, receiving a request authentication payload message from the communication device, wherein the request authentication payload message comprises the code word, and sending an authentication payload message to the communication device based on the code word.

20 Claims, 14 Drawing Sheets

(56) References Cited

U.S. PATENT DOCUMENTS

| 2011/0003582 | A1 | 1/2011 | Park et al. | |
|---|---|---|---|---|
| 2012/0008769 | A1 | 1/2012 | Collins et al. | |
| 2013/0111211 | A1* | 5/2013 | Winslow et al. | 713/171 |
| 2014/0018040 | A1 | 1/2014 | Kim | |
| 2014/0143137 | A1 | 5/2014 | Carlson | |

OTHER PUBLICATIONS

Mauer, Brain, et al., "Authentication Extension to Untrusted Devices on an Untrusted Network," filed Apr. 8, 2014, U.S. Appl. No. 14/256,102.

Advisory Action dated Mar. 5, 2014, U.S. Appl. No. 131005,859, filed Jan. 13, 2011.

Horn, et al., "Authentication Protocols for Mobile Network Environment Value-Added Services", Vehicular Technology, IEEE Transactions on (vol. 51, Issue 2), Mar. 2002, pp. 383-392, IEEE Xplore.

Suzuki, et al., "A System for End-to-End Authentication of Adaptive Multimedia Content", Communications and Multimedia Security IFIP—The International Federation for Information Processing vol. 175, 2005, pp. 237-249, Springer US.

Notice of Allowance dated Jun. 24, 2014, U.S. Appl. No. 13/005,859, filed Jan. 13, 2011.

Schneier, Bruce, "Applied Cryptography", Second Edition, 1996, Chapter 2, 2.2-2.5, Wiley and Sons.

Pre-Interview Communication dated May 7, 2013, U.S. Appl. No. 13/005,859, filed Jan. 1, 2013.

Persson, Carl J., et al. "Premium Services Authentication", filed Jan. 1, 2013, U.S. Appl. No. 13/005,859.

Bertz, Lyle T., et al., "Authenticated Delivery of Premium Communication Services to Trusted Devices Over an Untrusted Network", filed Jul. 9, 2013, U.S. Appl. No. 13/937,193.

Final Office Action dated Oct. 28, 2013, U.S. Appl. No. 13/005,859, filed Jan. 13, 2011.

Notice of Allowance dated Jun. 2, 2015, U.S. Appl. No. 13/937,193, filed Jul. 8, 2013.

Pre-Interview Communication dated Jun. 26, 2015, U.S. Appl. No. 14/256,102, filed Apr. 18, 2014.

* cited by examiner

AUTHENTICATED DELIVERY OF PREMIUM COMMUNICATION SERVICES TO UNTRUSTED DEVICES OVER AN UNTRUSTED NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication service providers provide a variety of services including voice communication, data communication, video communication, and others. Premium communication services may provide access to a variety of content including movies and streaming video as well as access to applications that may execute on server computers accessed by users over the communication network infrastructure. Premium communication services may be provided to subscribers who pay a subscription fee to access and/or use the premium communication services. A premium service provider may verify that a user has paid for the requested premium service before authorizing the user to consume the subject premium service, for example may verify that the user has paid for streaming video service before providing the streaming video in response to the user's request.

SUMMARY

In an embodiment, a method of authenticating a communication device for accessing premium communication services via an untrusted network is disclosed. The method comprises receiving a first request authentication payload message from a mobile communication device comprising an identification of a delegated premium service delivery service and a cellular wireless network access identity of the mobile communication device, wherein the mobile communication device is associated with a subscriber to cellular wireless communication service and generating a code word. The method further comprises storing an authentication payload that is indexed by the code word, wherein the authentication payload comprises the cellular wireless network access identity of the mobile communication device and transmitting the code word to the mobile communication device. The method further comprises receiving a second request authentication payload message from a communication device comprising an identification of a delegated premium service delivery service and the code word, wherein the communication device is different from the mobile communication device, retrieving the authentication payload based on the code word received in the second request authentication payload message, and transmitting the authentication payload to the communication device, whereby the communication device is enabled to access a premium communication service via an untrusted network based on the transmitted authentication payload.

In an embodiment, a method of authenticating a communication device for accessing premium communication services via an untrusted network is disclosed. The method comprises receiving a request message from a communication device, wherein the request message comprises an identification of a delegated premium service delivery service and a mobile directory number of a mobile communication device, wherein the mobile communication device is different from the communication device. The method further comprises transmitting a code word to the mobile communication device associated with the mobile directory number, receiving a request authentication payload message from the communication device, wherein the request authentication payload message comprises the code word, and sending an authentication payload message to the communication device based on the code word.

In an embodiment, a communication device is disclosed. The device comprises a short range radio transceiver, a processor, a memory, and an application stored in the memory. The application, when executed by the processor, receives an input from an input device of the communication device, wherein the input initiates access to a premium communication service via an untrusted network and, in response to receiving the input, prompts for input of a mobile device number of a mobile communication device, wherein the mobile communication device is associated with a subscription to the premium communication service. The application further receives a mobile device number input from the input device, builds a service request message, wherein the payload request message comprises the mobile device number, and transmits the service request message via the short range radio transceiver. The application further receives an input from the input device, wherein the input comprises a code presented by the mobile communication device, transmits the code via the short range radio transceiver, and receives premium communication service via the short range radio transceiver, whereby the communication device receives the premium communication service via an untrusted network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
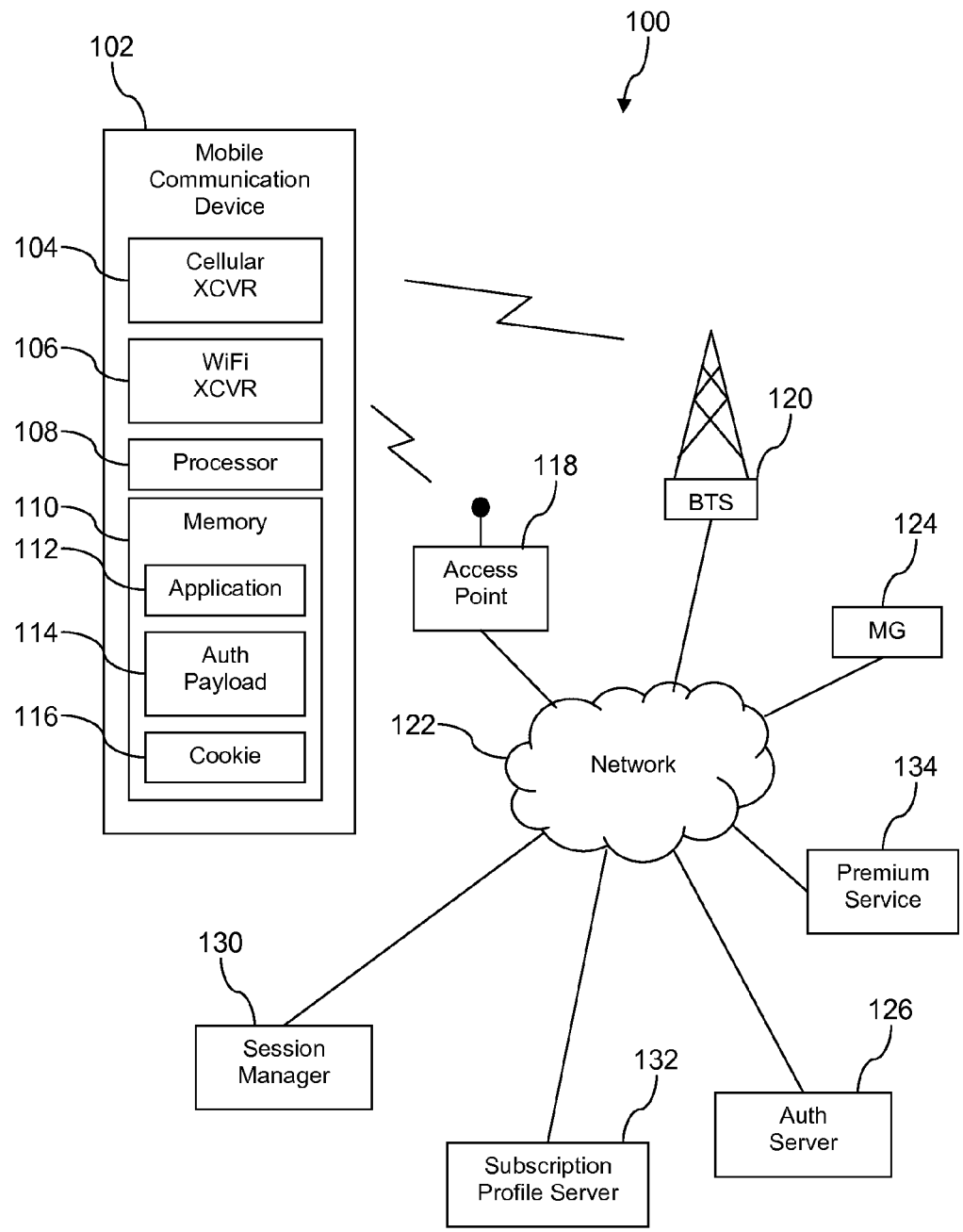
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

This disclosure teaches systems and methods of authenticating and/or authorizing delivery of premium communication services over an untrusted network. Two distinct scenarios are described herein: authenticated delivery of premium communication services to (1) a mobile communication device that is subscribed to receive cellular wireless communication service, and (2) a mobile communication device that is not subscribed to receive cellular wireless communication service. The devices of these different scenarios complete authentication and/or authorization in at least partly different ways before being able to access the premium communication services.

In one or more embodiments, a cellular communication device does not provide library functions to look up a cellular wireless network access identity stored on the device. In this case, a messaging sequence may be enacted to obtain the cellular wireless network access identity of the cellular communication device.

The cellular communication device encrypts a payload and sends a request for an identity service including the payload to a media gateway over a cellular wireless communication link. The cellular wireless communication link may be referred to as a trusted communication and/or trusted path. The media gateway sees the cellular wireless network access identity of the cellular communication device, builds a proxy authentication header, and inserts the cellular wireless network access identity into the proxy authentication header. The media gateway sends the proxy authentication header in a request for an authentication payload to an authentication server. The communication between the media gateway and the authentication server may likewise be referred to as a trusted communication and/or trusted path. The authentication server retrieves the cellular wireless network access identity from the proxy authentication header, decrypts the payload, adds a time-to-live value and the cellular wireless network access identity into the payload. The authentication server then encrypts the payload and returns it to the media gateway. The media gateway returns the authentication payload to the cellular communication device over the cellular wireless communication link, and the cellular communication device stores the authentication payload. The cellular wireless communication link between the cellular communication device and a base transceiver station (cell tower) and a communication link from the base transceiver station to the media gateway and the authentication server may be referred to as a trusted network. To request premium service, the cellular communication device can now use a two-step process to send the authentication payload over the untrusted network to obtain a cookie and to send a request for premium service with the cookie over an untrusted network. This two-step process is described further below.

The cellular communication device then builds a payload including the cellular wireless network access identity and encrypts the payload and sends an authentication request including the encrypted payload to a session manager over an untrusted network, for example via a WiFi wireless link. The session manager sends the authentication request to an authentication server, for example a WiFi authentication server. The authentication server decrypts the payload using a key known to itself and to the cellular communication device. The authentication server identifies the requested premium service from the request message and sends an authentication and/or authorization request to a subscription profile server along with the cellular wireless network access identity of the cellular communication device.

The subscription profile server determines whether the cellular wireless network access identity is known to be provisioned to receive the subject premium communication service. If the authorization succeeds, the subscription profile server returns an authorization to the authentication server. The authentication server creates a cookie and a proxy authentication header and sends these to the session manager. The session manager stores the cookie and proxy authentication header and sends a copy of the cookie to the cellular communication device. The cellular communication device stores the cookie.

The cellular communication device then builds a request for the premium communication service and includes the cookie in the request. The cellular communication device sends the request to the session manager over the untrusted network, for example over a WiFi wireless link. The session manager strips off the cookie, locates the proxy authentication header that it had previously stored, inserts the proxy authentication header into the request, and sends the request to a media gateway. The media gateway sends the request to a provider of the premium communication service. The provider of the premium communication service provides the requested service, for example streams video content, back to the media gateway. The media gateway returns the service to the session manager, and the session manager returns the service to the cellular communication device, for example streaming video over a WiFi wireless link to the cellular communication device.

The mobile communication device that is not subscribed to receive cellular wireless communication service may be referred to as a non-cellular communication device. It is noted that the term 'non-cellular communication device' is employed herein as a convenience for avoiding more convoluted and possibly obfuscating language. It is explicitly understood that such a 'non-cellular communication device' may be a cellular compatible device (e.g., may be suitable for providing cellular communications if configured with a wireless transceiver, such as a cellular communication dongle or cellular communication card and if subscribed for a cellular communication service). It is explicitly understood that such a 'non-cellular communication device' may be a cellular capable device that is being operated in a location where cellular communication links are not available to it—for example out of coverage of any cellular service or out of coverage of cellular service to which the device is subscribed (for example, the cellular communication service subscription for the device may not allow roaming onto an available cellular coverage provided by an unaffiliated cellular communication provider). It is explicitly understood that such a 'non-cellular communication device' may be a cellular capable device whose cellular service subscription has expired and/or been allowed to expire in favor of the user migrating the subscription to a different device.

The non-cellular communication device may be, for example, a portable computer having a WiFi wireless interface card. It is understood that the non-cellular communication device is associated with a cellular communication device, for example a cellular wireless communication subscriber who owns a cellular communication device may own the non-cellular communication device and may wish to consume premium communication services that are provisioned to the cellular communication device using instead the non-cellular communication device. For example, cellular wireless communication service subscriber may wish to consume a streaming video premium communication service provisioned for his or her mobile phone using his or her notebook computer.

The cellular communication device may encrypt a payload and send a request for a service including the encrypted payload to a media gateway. This request may be said to be sent over a trusted path. The media gateway may insert a proxy authentication header into the request and forward to an authentication server. The authentication server determines the cellular wireless network access identity of the cellular communication device from the proxy authentication header, decrypts the payload, generates a user readable code word, and generates an authentication payload. The authentication server stores the authentication payload indexed by the user readable code word. The authentication server returns the authentication payload or a copy of the authentication payload to the cellular communication device via the media gateway. The cellular communication device displays the code word.

The user of the cellular communication device reads the displayed code word and enters it into a user interface of the non-cellular communication device, for example in a graphical user interface associated with accessing premium services. Alternatively, the code word could be transmitted from the cellular communication device by other communication operations. The code word could be transmitted by near field communication to the non-cellular communication device. The code word could be transmitted by WiFi or Bluetooth® radio signal from the cellular communication device to the non-cellular communication device. The code word could be transmitted by an optical signal from the cellular communication device to the non-cellular communication device. The code word could be transmitted over a wired communication link from the cellular communication device to the non-cellular communication device. The code word could be transmitted by an acoustic signal from the cellular communication device to the non-cellular communication device, for example using a dual tone multi-frequency acoustic signal. For example, a speaker of a cellular communication device could produce an acoustic signal that is received by a microphone of the non-cellular communication device. The non-cellular communication device sends a request for an authentication payload including the code word to the authentication server. The authentication server builds an authentication payload including a time-to-live and the cellular wireless network access identity that was associated with the code word previously, encrypts the authentication payload, and sends the encrypted authentication payload to the non-cellular communication device. The non-cellular communication device can now use the encrypted authentication payload to access the premium service in the two step process described above of obtaining the cookie and requesting the premium service with the cookie.

The several methods of obtaining premium services over an untrusted network may promote selling premium communication services and increasing revenues of a wireless service provider while not overburdening the radio access network with traffic. For example, the bandwidth consuming delivery of streaming video may be diverted to an untrusted network that may comprise an inherently less expensive infrastructure.

Turning now to FIG. 1, a communication system 100 is described. In an embodiment, the system 100 comprises a mobile communication device 102, a wireless access point 118, a cellular base transceiver station 120, a network 122, a media gateway (MAG) 124, an authorization server 126, a session manager 130, a subscription profile server 132, and a premium service server 134. It is understood that the system 100 may comprise any number of the components 102, 118, 120, 124, 126, 130, 132, and/or 134. The media gateway 124, the authentication server 126, the session manager 130, the subscription profile server 132, and the premium service 134 may be implemented as computer systems. Computer systems are described in more detail hereinafter.

The mobile communication device 102 may be a mobile phone, a personal digital assistant (PDA), or a media player. In an embodiment, the mobile communication device 102 may be implemented as a handset. Handsets are described in more detail hereinafter. The mobile communication device 102 is provisioned to receive wireless communication service by a wireless communication service provider, for example to receive voice and/or data communication service via a wireless link to a radio access network (RAN) operated or leased by the service provider. The mobile communication device 102 comprises a cellular radio transceiver 104, a short range radio transceiver 106, a processor 108, and a memory 110. In an embodiment, the short range radio transceiver 106 may be a WiFi radio transceiver.

The cellular radio transceiver 104 is configured to establish a radio communication link with the base transceiver station 120 based on one or more of a code division multiple access (CDMA) wireless communication protocol, a global system for mobile communications (GSM) wireless communication protocol, a long-term evolution (LTE) wireless communication protocol, a worldwide interoperability for microwave access (WiMAX) wireless communication protocol, or another cellular wireless communication protocol. The base transceiver station 120 provides connectivity to the network 122 to the mobile communication device 102. The network 122 comprises one or more private networks, one or more public networks, or a combination thereof. The network 122 promotes communication as desired among the several components 118, 120, 124, 126, 130, 132, 134.

The short range radio transceiver 106 is configured to establish a radio communication link with the wireless access point 118 based on a WiFi wireless communication protocol, a Bluetooth® wireless communication protocol, or based on another short range wireless communication protocol. As used herein, short range refers to wireless communication that is limited to establishing radio links over a maximum distance of 1000 feet or less; long range refers to wireless communication that is limited to establishing radio links over a maximum distance of at least 2000 feet and under some circumstances a maximum distance of several miles. The wireless link in cellular wireless communications typically is established using long range wireless transceivers; the wireless link in WiFi wireless communications and Bluetooth® wireless communications, for example, typically is established using short range wireless transceivers.

In an embodiment, the user of the mobile communication device 102 is subscribed to one or more premium communication services such as a streaming video service, supplemental sports content (i.e., listen in on NASCAR pit-crew chatter, listen in on mic-ed NFL football player, and the like), fantasy sports league data feeds, and others. While it is understood that it is the user that is subscribed to the subject premium communication service, in some contexts herein the disclosure may state that the mobile communication device 102 is subscribed to the premium subscription service. The premium service 134 may be a server computer that propagates the subject communication to the user, for example to the mobile communication device 102 or to another device that the user wishes to use to consume the premium communication service.

The communication associated with the premium communication service is transmitted to the mobile communication device 102 via the wireless access point 118. This wireless link may be referred to as an untrusted network in some contexts. The term untrusted is used to distinguish between the level of trust accorded to the communication between the base transceiver station 120 and the cellular transceiver 104 as well as other nodes of a wireless communication service provider infrastructure and the level of trust accorded to the communication between the wireless access point 118 and the short range wireless transceiver 106. It is generally assumed that the base transceiver station 120 cannot be spoofed and that the wireless communication link between the cellular transceiver 104 and the base transceiver station 120 cannot be hacked. It is thought that the wireless access point 118 can be spoofed (e.g., a device can successfully fool the wireless access point 118 that it is the short range radio transceiver 106 and/or the mobile communication device 102 when in fact it is not) and/or that the wireless communication link between the short range radio transceiver 106 and the wireless access point 118 can be hacked, and hence this may be deemed an untrusted link or an untrusted network.

It may be desirable to deliver the premium communication service via the untrusted network (e.g., via the wireless communication link between the short range radio transceiver 106 and the wireless access point 118) to reduce the traffic load on the trusted network (e.g., the wireless communication link between the cellular radio transceiver 104 and the base transceiver station 120). It is understood that the radio spectrum and/or bandwidth of the base transceiver station 120 is limited and that adding one or more base transceiver stations 120 to the radio access network of the wireless service provider to carry increased traffic is expensive and time consuming. On the other hand, adding additional wireless access points 118, for example additional WiFi hot spots, may be relatively inexpensive and may be completed with a quick turn-around time. Delivering the premium communication service via the untrusted network, however, raises the question of how to authenticate and authorize the short range radio transceiver 106 and/or the mobile communication device 102 for accessing the premium communication services over the untrusted network.

Figure 2:
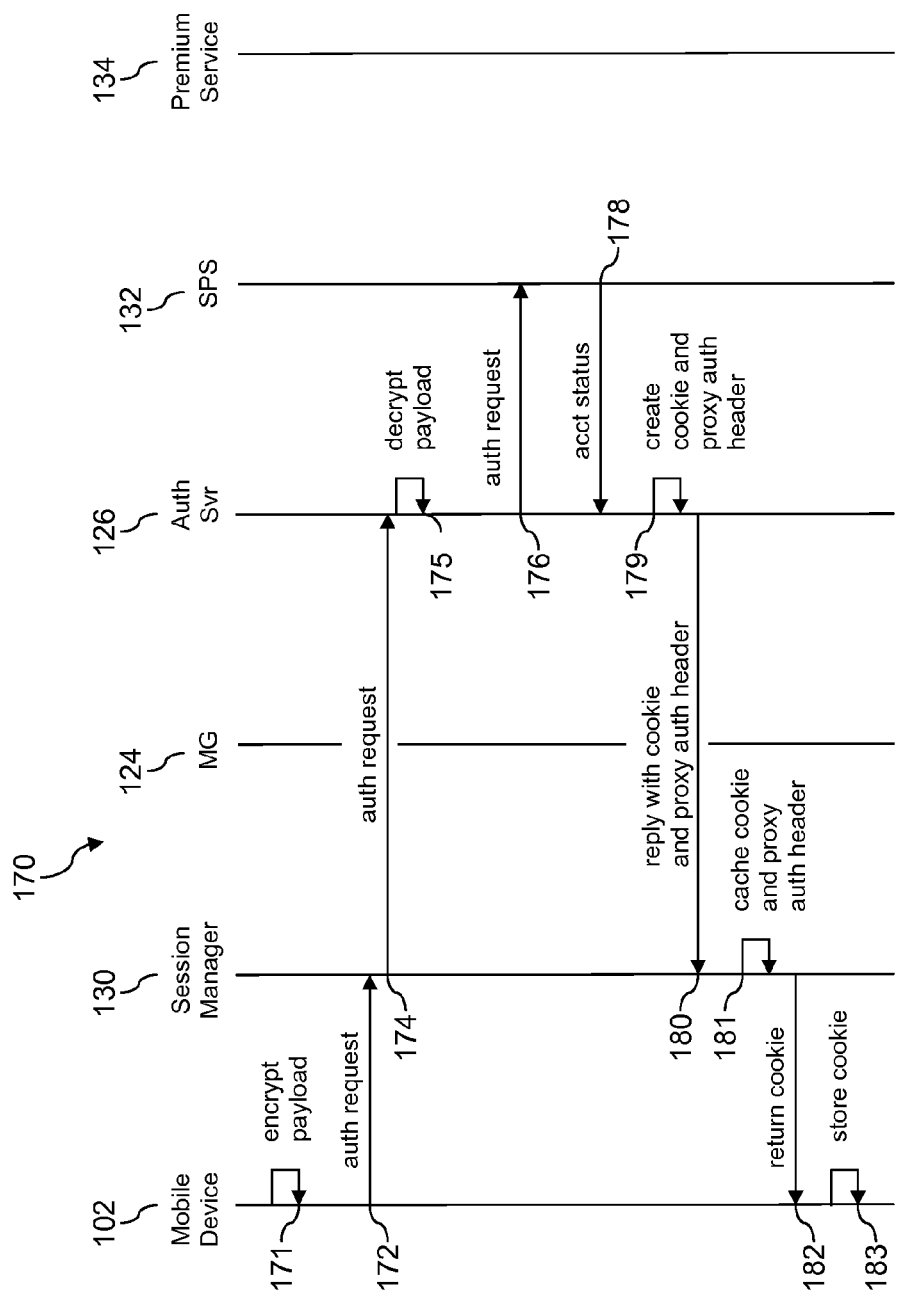
FIG. 2 is a message sequence diagram according to an embodiment of the disclosure.

Turning now to FIG. 2, a message sequence 170 is described. At label 171, the mobile device 102 looks up a cellular wireless network access identity of the mobile communication device 102, builds a payload including the cellular wireless network access identity, and encrypts the payload with an encryption key known to the mobile communication device 102 and to the authentication server 126. In an embodiment, the cellular wireless network access identity comprises one or more of a network access identity (NAI), an electronic serial number (ESN), a mobile directory number (MDN, e.g., the phone number of the device), or other identifying information. The activity associated with label 171 may be performed, at least in part, by a premium services application 112 stored in the memory 110. The premium services application 112 may call a library function installed on the mobile communication device 102 to look up the cellular wireless network access identity. Alternatively, the premium services application 112 may perform a process described further below with reference to FIG. 4 to determine the cellular wireless network access identity.

The mobile communication device 102 sends an authentication request message 172 including the encrypted payload to the session manager 130 via the untrusted network, for example via a wireless communication link between the short range radio transceiver 106 and the wireless access point 118. The session manager 130 sends an authentication request message 174 including the encrypted payload to the authentication server 126. At label 175 the authentication server 126 decrypts the payload, authenticates the mobile communication device 102 based on the cellular wireless network access identity contained in the payload, and, assuming the authentication succeeds, sends an authorization request message 176 to the subscription profile server 132. The authorization request message 176 may identify the specific premium communication service that is of interest to the mobile communication device. This specific premium communication service may be identified in the encrypted payload. Note that this use of the wireless network identity of the mobile communication device 102 leverages the relatively high level of security associated with cellular communication network infrastructure to provide increased security when accessing premium content via a relatively untrusted network.

The subscription profile server 132 determines if the mobile communication device 102 and/or the user associated with the mobile communication device 102 has been provisioned to access the subject premium communication service and sends an account status message 178 to the authentication server 126. At label 179, if the mobile communication device 102 or the user of the mobile communication device is authorized to access the subject premium communication service, the authentication server creates a cookie, a proxy authentication header, and sends a reply message 180 including the cookie and the proxy authentication header to the session manager 130. As is known to one skilled in the computer arts, cookies may be used for a variety of purposes. The cookie described herein may be used as a token or key for accessing premium communication services as described further hereinafter.

At label 181, the session manager 130 caches or stores the cookie and the proxy authentication header in such a way that the proxy authentication header can be looked up or retrieved based on the cookie. In some contexts, the proxy authentication header may be said to be associated with the cookie and/or indexed by the cookie. The session manager 130 sends a return message 182 including the cookie or a copy of the cookie to the mobile communication device 102 via the untrusted network, for example via the wireless communication link between the short range radio transceiver 106 and the wireless access point 118. At label 183, the mobile communication device stores the cookie in the memory 110, for example as cookie 116.

Figure 3:
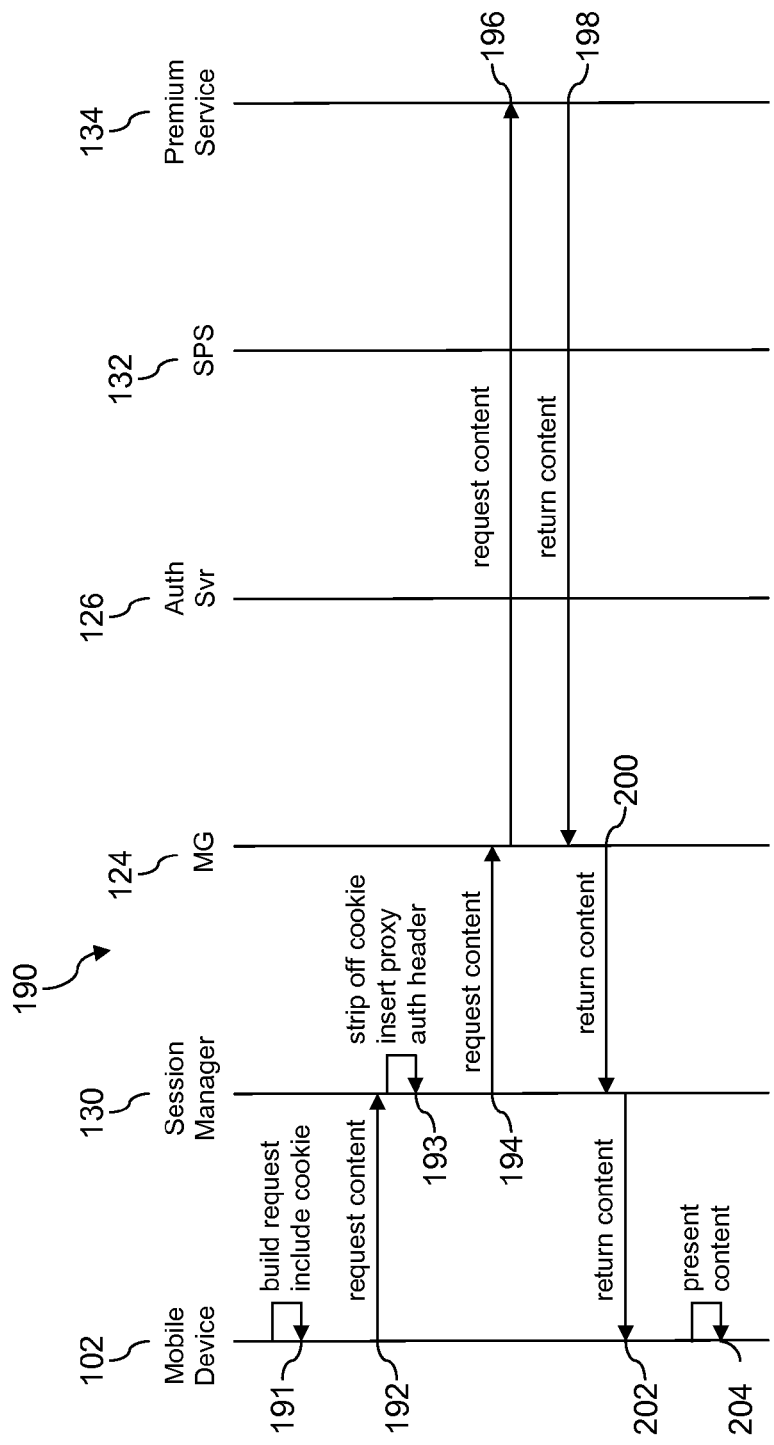
FIG. 3 is another message sequence diagram according to an embodiment of the disclosure.

Turning now to FIG. 3, a message sequence 190 is described. At label 191, the mobile communication device 102 builds a request including the cookie 116 or a copy of the cookie 116. The mobile communication device 102 sends a request content message 192 including the cookie to the session manager 130 via the untrusted network, for example via a wireless communication link between the short range radio transceiver 106 and the wireless access point 118. At label 193, the session manager 130 looks up the proxy authentication header associated with the cookie based on the cookie sent by the mobile communication device 102, strips the cookie off the request message, and inserts the proxy authentication header into the request content message 194. The session manager 130 sends the request content message 194 to the media gateway 124. The media gateway 124 sends a request content message 196 to the premium communication service server 134. The premium communication service server 134 may be identified, at least in part, by the request content message 192. For example, the request content message 192 may identify a streaming video premium communication service, and the media gateway 124 may identify the premium communication service server 134 based on the request for streaming video premium communication service.

The premium communication service server 134 sends a return content message 198 (e.g., sends content or data requested, for example streaming video or other communication content or data) to the media gateway 124. The media gateway 124 sends a return content message 200 (e.g., relays the content sent by the premium communication service server 134) to the session manager 130. The session manager sends a return content message 202 (e.g., relays the content sent by the media gateway 124) to the mobile communication device 102 via the untrusted network, for example via the wireless communication link between the short range radio transceiver 106 and the wireless access point 118. At label 204, the mobile communication device 102 consumes the content, for example presents content on a display of the mobile communication device 102. In this way, premium communication service content is provided to the mobile communication device 102 over an untrusted network and a traffic load on the trusted network is mitigated. For related details, see U.S. patent application Ser. No. 13/005,859, filed Jan. 13, 2011, entitled "Premium Services Authentication," by Carl J. Persson, et al., which is incorporated herein in its entirety.

Figure 4:
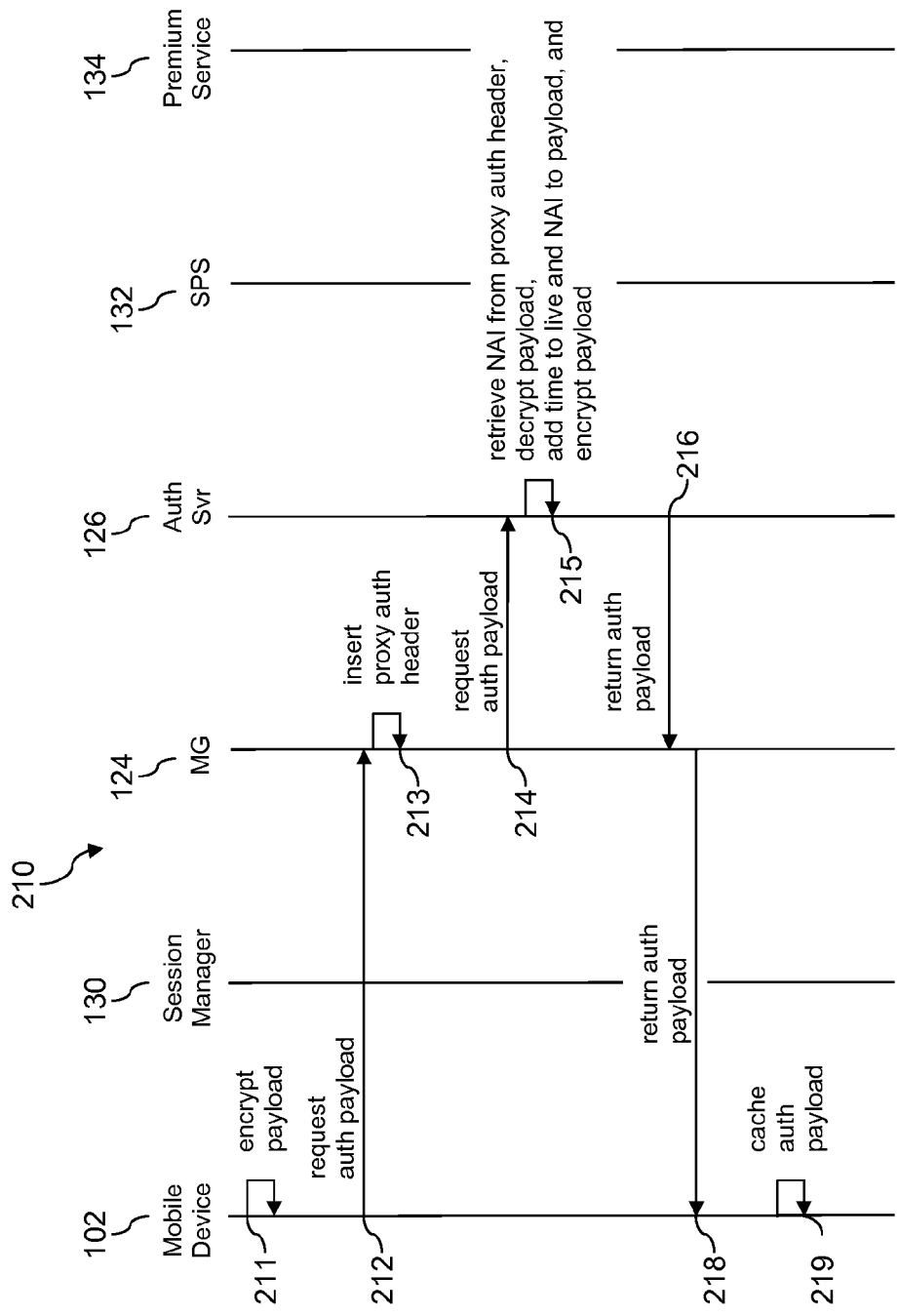
FIG. 4 is another message sequence diagram according to an embodiment of the disclosure.

Turning now to FIG. 4, a message sequence 210 is described. At label 211, the mobile communication device 102 encrypts a payload using a key known to it and to the authentication server 126. For example, the premium services application 112 encrypts the payload. The mobile communication device 102 transmits a request authentication payload message 212 to the media gateway 124 over the trusted network, for example via a wireless communication link between the cellular radio transceiver 104 and the base transceiver station 120. The request authentication payload message 212 identifies a service that is not a premium service. In an embodiment, the service may be an identification service. The mobile communication device 102 may not be able to determine its own cellular wireless network access identity, for example the mobile communication device 102 may not be able to look up its own cellular wireless network access identity using a library function executed on the device 102.

The media gateway 124 has white listed the service requested by the mobile communication device 102, meaning that the media gateway 124 will pass the request on without authenticating the mobile communication device 102. At label 213, the media gateway 124 inserts a proxy authentication header comprising a cellular wireless network access identity of the mobile communication device 102 into the request authentication payload message. The media gateway 124 may determine the cellular wireless network access identity based on information about the device 102 known by the base transceiver station 120. The cellular wireless network access identity may comprise one or more of a network access identity (NAI), an electronic serial number (ESN), a mobile directory number (MDN, e.g., the phone number of the device), or other identifying information. The media gateway 124 sends a request authentication payload message 214 to the authentication server 126. At label 215, the authentication server 126 retrieves the cellular wireless network access identity from the proxy authentication header and decrypts the payload. The authentication server 126 adds a time-to-live value and the cellular wireless network access identity to the payload, encrypts the payload with the encryption key, and sends a return authentication payload message 216 including the encrypted payload to the media gateway 124. The time-to-live value may be used to restrict the length of time over which the mobile communication device 102 is able to access premium communication services without repeating the steps of authentication and/or authorization.

The media gateway 124 sends a return authentication payload message 218 to the mobile communication device 102 via the trusted network, for example via the wireless communication link between the cellular radio transceiver 104 and the base transceiver station 120. At label 219, the mobile communication device caches or stores the authentication payload. The mobile communication device 102 may now obtain a cookie following the message sequence 170 described above with reference to FIG. 2 and access premium services over the untrusted network (e.g., via a wireless communication link between the short range radio transceiver 106 and the wireless access point 118) using the obtained cookie following the message sequence 190 described above with reference to FIG. 3.

Figure 5:
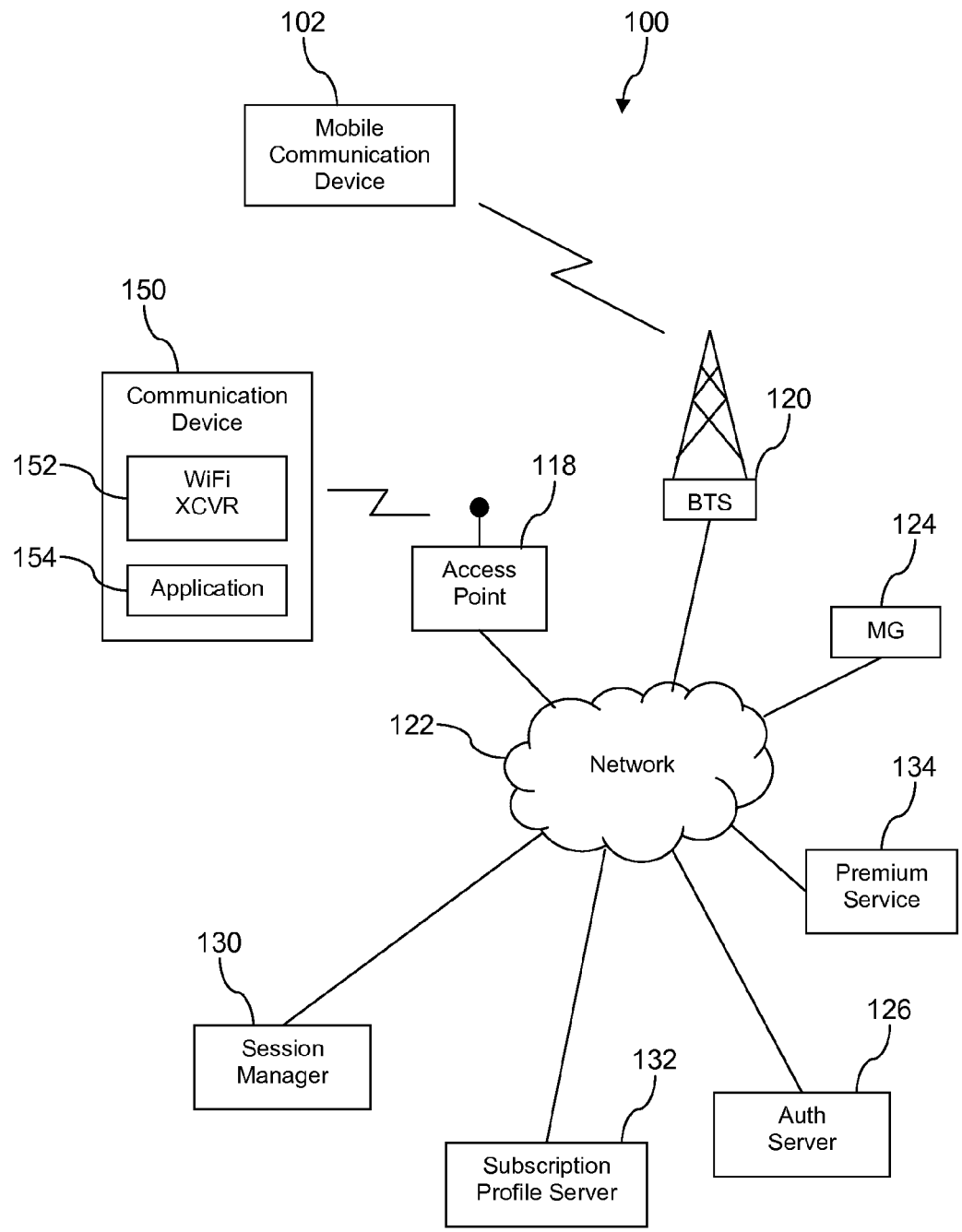
FIG. 5 is a block diagram of a communication system according to an embodiment of the disclosure.

Turning now to FIG. 5, further details of system 100 are described. In an embodiment, the system 100 further comprises a communication device 150. The communication device 150 may be a laptop computer, a notebook computer, a tablet computer, a desktop computer, or some other computer and/or display. In an embodiment, the communication device 150 does not have a cellular radio transceiver. In some contexts, the communication device 150 may be referred to as a non-cellular communication device. The communication device 150 comprises a short range radio transceiver 152, for example a WiFi radio transceiver, and a premium services application 154. The communication device 150 may be owned and/or accessible to the user of the mobile communication device 102 or to the user provisioned to access premium communication service. Under some circumstances, the user may wish to consume premium communication services using the communication device 150 rather than using the mobile communication device 102. For example, the communication device 150 may be a flat screen television having a WiFi radio transceiver, and the wireless access point 118 may be a WiFi hot spot in the user's home. In some contexts, the communication device 150 may be referred to as an untrusted device because it may connect to the network 122 only via the untrusted network, for example, only via a wireless communication link between the short range radio transceiver 152 and the wireless access point 118. The communication device 150 corresponds to the device referred to as a non-cellular communication device above.

Figure 6:
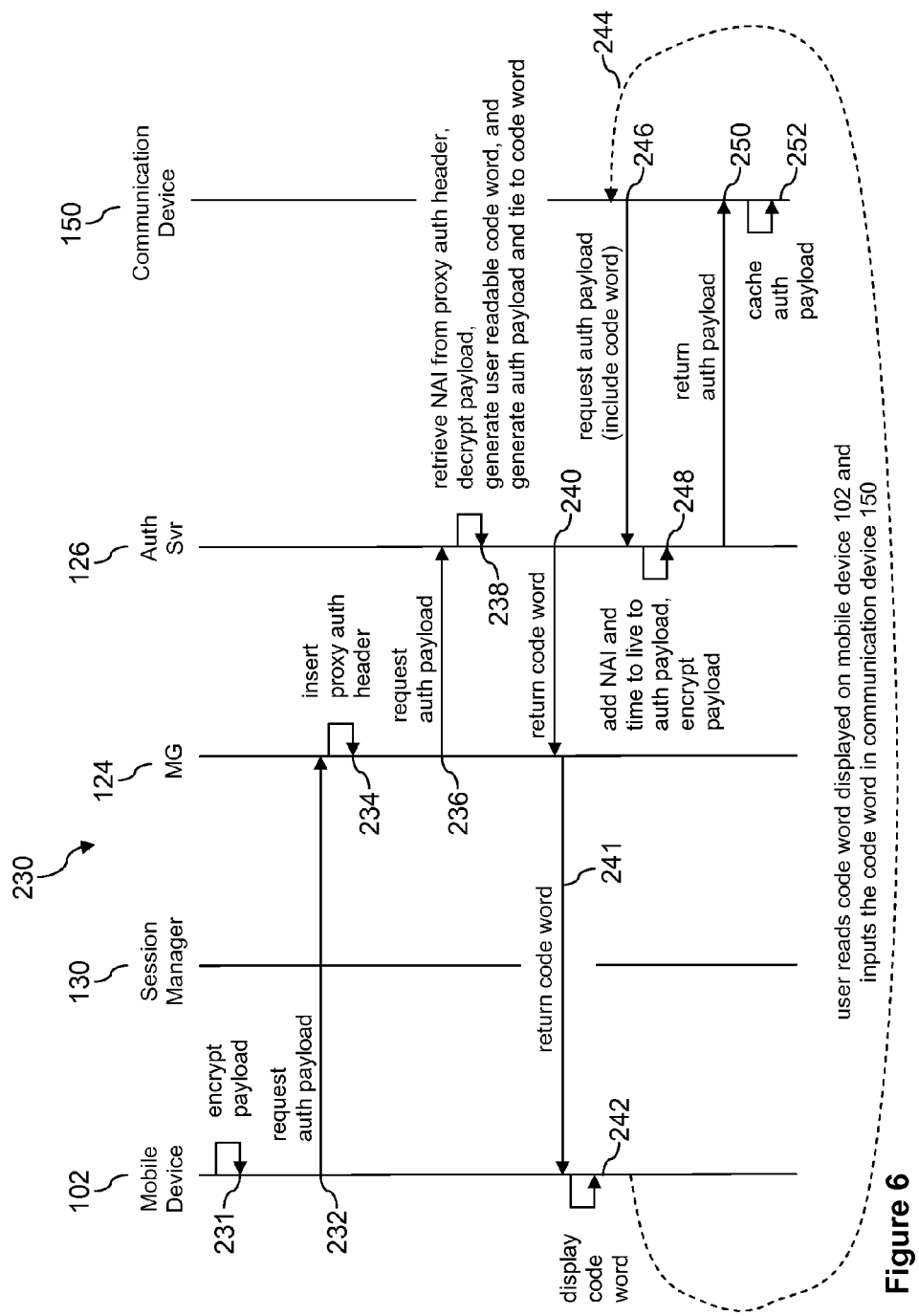
FIG. 6 is another message sequence diagram according to an embodiment of the disclosure.

Turning now to FIG. 6, a message sequence 230 is described. At block 231 the mobile communication device 102 encrypts a payload using a key known to it and to the authentication server 126. For example, the premium services application 112 encrypts the payload. The mobile communication device 102 transmits a request authentication payload message 232 to the media gateway 124 over the trusted network, for example via a wireless communication link from the cellular radio transceiver 104 and the base transceiver station 120. The request authentication payload message 232 identifies a service that is not a premium service. In an embodiment, the service may be referred to as a delegated premium communication service setup service.

The media gateway 124 has white listed the service requested by the mobile communication device 102. At label 234, the media gateway 124 inserts a proxy authentication header comprising a cellular wireless network access identity of the mobile communication device 102 into the request authentication payload message. The media gateway 124 may determine the cellular wireless network access identity based on information about the device 102 known by the base transceiver station 120. The cellular wireless network access identity may comprise one or more of a network access identity (NAI), an electronic serial number (ESN), a mobile directory number (MDN, e.g., the phone number of the device), or other identifying information. The media gateway 124 sends a request authentication payload message 236 to the authentication server 126. The authentication server 126 retrieves the cellular wireless network access identity from the proxy authentication header and decrypts the payload.

At label 238, the authentication server 126 generates a user readable code word, retrieves the cellular wireless network access identity from the proxy authentication header, and stores the cellular wireless network access identity indexed or associated to the user readable code word. The authentication server 126 builds an authentication payload comprising the code word. The authentication server 126 sends a return code word message 240 containing the authentication payload to the media gateway 124. The media gateway 124 sends a return code word message 241 containing the authentication payload to the mobile communication device 102 via the trusted network, for example via the wireless communication link between the cellular radio transceiver 104 and the base transceiver station 120. At label 242, the mobile communication device 102 presents the code word on a display of the mobile communication device 102.

At 244, the user of the mobile communication device 102 reads the presented code word and manually enters it into the communication device 150, where the communication device 150 is described above with reference to FIG. 5. For example, the premium services application 154 installed on the communication device 150 presents a user interface and prompts the user to read the code word displayed on the mobile communication device 102 and to input the code word into the communication device 150. The communication device 150 sends a request authentication payload message 246 including the code word to the authentication server 126 via an untrusted network, for example via a wireless communication link between the short range radio transceiver 152 and the wireless access point 118. Alternatively, other processes may be employed to automatically transfer the code word from the mobile communication device 102 to the communication device 150, as enumerated above.

At label 248, the authentication server 126 retrieves the stored cellular communication network access identity that it looks up using the code word, adds the cellular communication network access identity and a time-to-live value to an authentication payload, encrypts the authentication payload, and sends a return authentication payload message 250 including the encrypted authentication payload to the communication device 150 via the untrusted network, for example the wireless communication link between the short range radio transceiver 152 and the wireless access point 118. The communication device 150 caches or stores the authentication payload. The communication device 150 may then use the authentication payload to obtain a cookie as in the message sequence 170 described above with reference to FIG. 2 and access premium communication services using the cookie as in the message sequence 190 described above with reference to FIG. 3.

Figure 7:
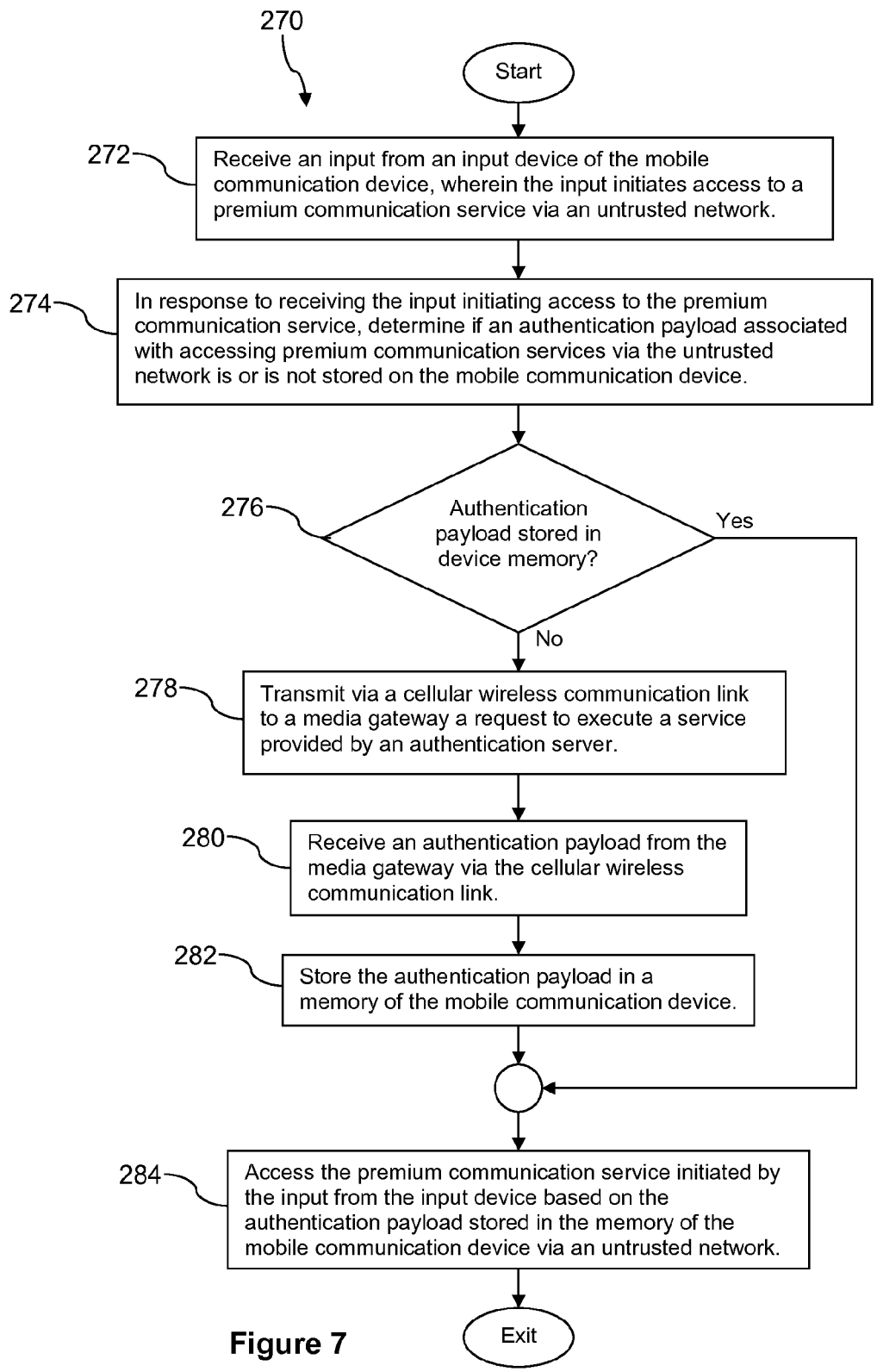
FIG. 7 is a flow chart of another method according to an embodiment of the disclosure.

Turning now to FIG. 7, a method 270 is described. At block 272, receive an input from an input device of the mobile communication device 102, wherein the input initiates access to a premium communication service via an untrusted network. For example, the user input selects a streaming video premium communication service, for example NETFLIX. At block 274, in response to receiving the input initiating access to the premium communication service, determine if an authentication payload associated with accessing premium communication services via the untrusted network is or is not stored on the mobile communication device. At block 276, if an authentication payload is determined to be stored in the memory 110 of the mobile communication device 102, the method 270 proceeds to block 284 otherwise it proceeds to block 278.

At block 278, transmit a request to execute a service provided by the authorization server 126, where the request is transmitted via a cellular wireless communication link to the media gateway 124. In block 278, the service requested is not a premium communication service but rather a service related to obtaining an authentication payload comprising a network access identity of the mobile communication device 102, for example the identification service described above with reference to FIG. 4. The mobile communication device 102 transmitting the request via the cellular wireless communication link to the media gateway 124 comprises the cellular radio transceiver 104 transmitting the request over a wireless link to the base transceiver station 120, and the base transceiver station 120 transmitting the request to the media gateway 124 via the network 122. In some contexts, this may be referred to as the mobile communication device 102 transmitting the request via a trusted network to the media gateway 124.

At block 280, receive an authentication payload from the media gateway 124 via the cellular wireless communication link between the cellular radio transceiver 104 and the base transceiver 120. As above, in some contexts this may be referred to as the mobile communication device 102 receiving the authentication payload via a trusted network. At block 282, store the authentication payload on the mobile communication device 102, for example as an authentication payload 114 in the memory 110. At block 284, access a premium communication service initiated by the input from the mobile communication device received in block 272, based on the authentication payload stored in the memory 110 of the mobile communication device 102, via an untrusted network. For example, access a premium communication service over a wireless communication link between the short range radio transceiver 106 and the wireless access point 118, as described in more detail above with reference to message sequence 190 depicted in FIG. 3 and with reference to message sequence 170 depicted in FIG. 2.

Figure 8:
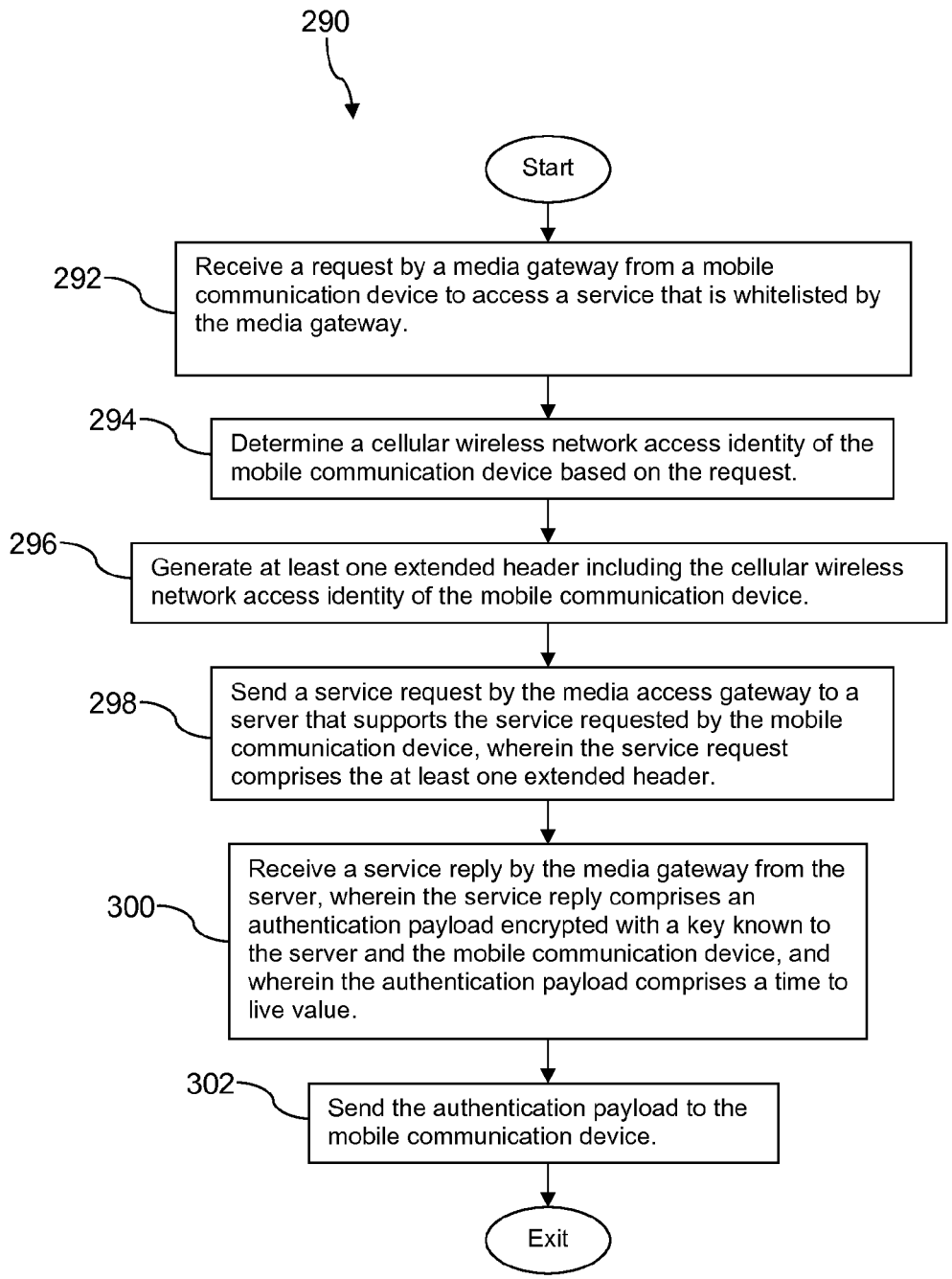
FIG. 8 is a flow chart of another method according to an embodiment of the disclosure.

Turning now to FIG. 8, a method 290 is described. At block 292, the media gateway 124 receives a request from the mobile communication device 102 to access a service, wherein the service is whitelisted by the media gateway 124. At block 294, the media gateway 124 determines a wireless communication network access identity of the mobile communication device 102 based on the request received from the mobile communication device 102. In an embodiment, the service requested is not a premium communication service, for example an identification service described above with reference to FIG. 4. The media gateway 124 may be said to receive the request from the mobile communication device 102 via a trusted network in that the request is transmitted via a wireless communication link from the cellular radio transceiver 104 to the base transceiver station 120 and via a communication link from the base transceiver station 120 to the media gateway 124 via the network 122. At block 296, the media gateway 124 generates at least one extended header including the cellular communication network access identity of the mobile communication device 102.

At block 298, the media gateway 124 sends a service request to the authentication server 126 comprising the extended header. At block 300, the media gateway 124 receives a service reply from the authentication server 126, wherein the service reply comprises an authentication payload encrypted with a key known to the authentication server 126 and to the mobile communication device 102. In an embodiment, the authentication payload comprises a time-to-live value. At block 302, the media gateway 124 sends the authentication payload to the mobile communication device 102 via the base transceiver station 120 over a cellular wireless communication link between the base transceiver station 120 and the cellular radio transceiver 104 of the mobile communication device 102. This may be referred to in some contexts as sending the authentication payload to the mobile communication device 102 via the trusted network. In an embodiment, the method 290 may further comprise using the authentication payload to access premium communication services as described further above with reference to FIG. 7, FIG. 3, and FIG. 2. For further details, see U.S. patent application Ser. No. 13/937,193, filed Jul. 9, 2013, entitled "Authenticated Delivery of Premium Communication Services to Trusted Devices Over an Untrusted Network," by Lyle T. Bertz, et al., which is herein incorporated by reference in its entirety.

Figure 9:
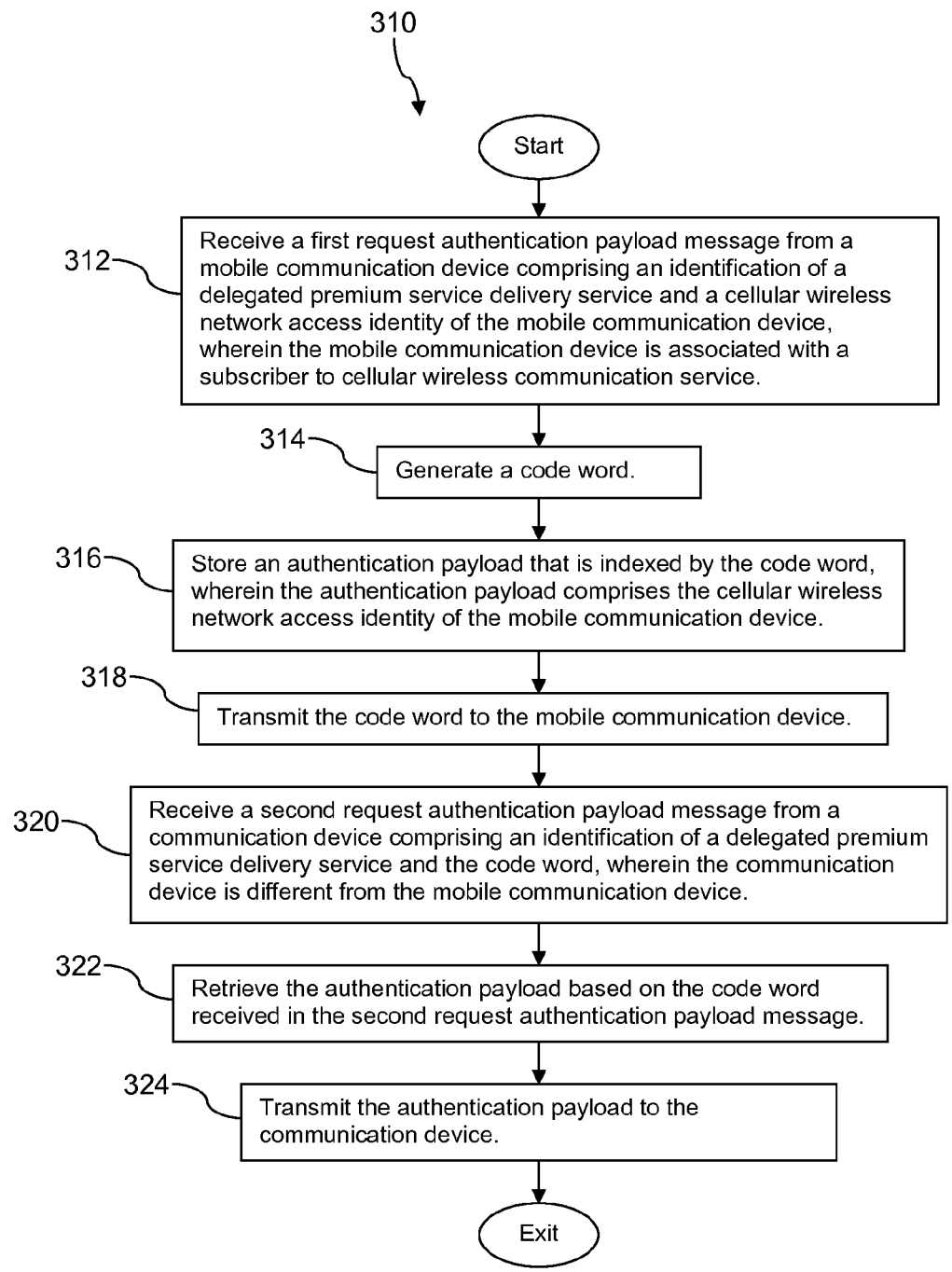
FIG. 9 is a flow chart of another method according to an embodiment of the disclosure.

Turning now to FIG. 9, a method 310 is described. In an embodiment, the steps of method 310 may be performed by the authentication server 126 described above. At block 312, receive a first request authentication payload message from a mobile communication device comprising an identification of a delegated premium service delivery service and a cellular wireless network access identity of the mobile communication device, wherein the mobile communication device is associated with a subscriber to cellular wireless communication service. For example, the authentication server 126 receives the first request authentication payload message from the media gateway 124, and the media gateway 124 may have received the request from the mobile communication device 102 (or indirectly from the mobile communication device 102 via the base transceiver station 120 and the network 122). The cellular wireless network access identity is described further above.

At block 314, generate a code word. The code word may be any combination of digits and/or characters. In an embodiment, the code word may be six digits, six characters, or a mix of six digits and characters. At block 316, store an authentication payload that is indexed by the code word, wherein the authentication payload comprises the cellular wireless network access identity of the mobile communication device. By storing the authentication payload indexed by the code word, the authentication payload may later be looked up based on receipt of a message containing the code word.

At block 318, transmit the code word to the mobile communication device. For example, the code word is transmitted in a message to the mobile communication device 102 indirectly via the media gateway 124, the network 122, and the base transceiver station 120 or via some other communication path. The mobile communication device 102 may present the code word on a display of the mobile communication device 102. The user may read the displayed code word and input the same code word into a user interface of the communication device 150 as described above. Alternatively, the code word may be transmitted automatically from the mobile communication device 102 to the communication device 150 using another process as enumerated above, for example via a non-cellular radio transmission, via an optical signal transmission, via an acoustic signal transmission, or via another transmission.

At block 320, receive a second request authentication payload message from a communication device comprising an identification of a delegated premium service delivery service and the code word, wherein the communication device is different from the mobile communication device. For example, the communication device 150 transmits the second request authentication payload message comprising the code word to the authentication server 126 indirectly via a wireless communication link between the short range radio transceiver 152 and the wireless access point 118, from the wireless access point 118 to the network 122, and from the network 122 to the authentication server 126. As described further above, the wireless link from the short range radio transceiver 152 to the wireless access point 118 may be considered to be an untrusted network and the communication device 150 may likewise be considered to be an untrusted device.

At block 322, retrieve the authentication payload based on the code word received in the second request authentication payload message. At block 324, transmit the authentication payload to the communication device. For example, the authentication server 126 transmits the authentication payload to the communication device 150 via the network 122 and the wireless access point 118. The communication device 150 may then use the authentication payload as described further above to ultimately access premium communication services, for example streaming video, via the short range radio transceiver 152 over the untrusted network.

Figure 10:
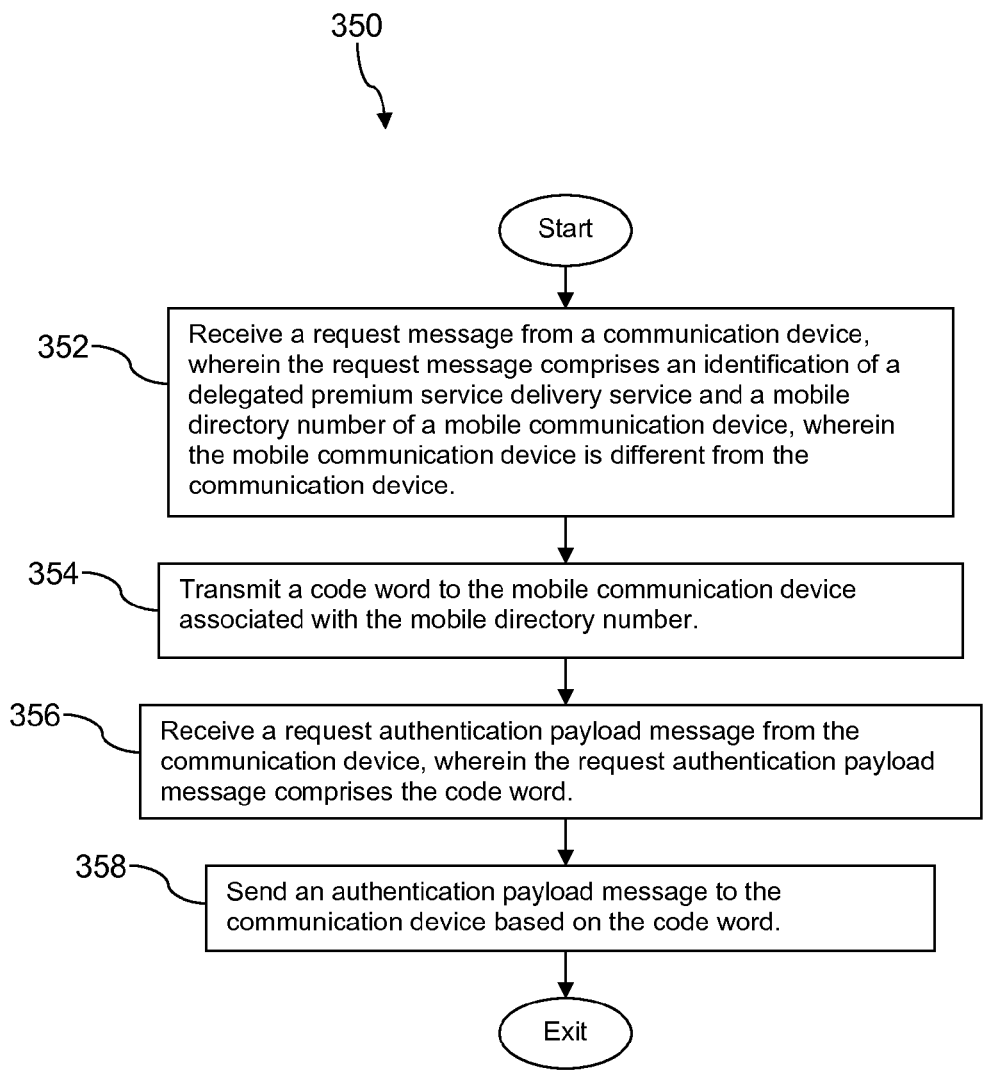
FIG. 10 is a flow chart of another method according to an embodiment of the disclosure.

Turning now to FIG. 10, a method 350 is described. In an embodiment, the steps of the method 350 may be performed by the authentication server 126 described further above. At block 352, receive a request message from a communication device, wherein the request message comprises an identification of a delegated premium service delivery service and a mobile directory number of a mobile communication device, wherein the mobile communication device is different from the communication device. For example, the authentication server 126 receives a request for an authentication payload from the communication device 150 containing the mobile directory number of the mobile communication device 102 that is subscribed to access premium communication services. The communication device 150 may send the request for the authentication payload via an untrusted network, for example via a wireless communication link from the short range radio transceiver 152 to the wireless access point 118, from the wireless access point 118 to the network 122, and from the network 122 to the authentication server 126. At block 354, transmit a code word to the mobile communication device associated with the mobile directory number. For example, transmit a code word to the mobile communication device 102 indirectly via the media gateway 124, via the network 122, and via the base transceiver station 120. The code word may be any combination of numbers and/or characters. The mobile communication device 102 may present the code word on a display of the mobile communication device 102. The user may read the displayed code word and input the same code word into a user interface of the communication device 150 as described above. Alternatively, the code word may be transmitted automatically from the mobile communication device 102 to the communication device 150 using another process as enumerated above, for example via a non-cellular radio transmission, via an optical signal transmission, via an acoustic signal transmission, or via another transmission.

At block 356, receive a request authentication payload message from the communication device, wherein the request authentication payload message comprises the code word. For example, receive the request authentication payload message comprising the code word from the communication device 150 via the untrusted network. At block 358, send an authentication payload message to the communication device based on the code word. For example, the authentication server 126 transmits the authentication payload to the communication device 150. The communication device 150 may then use the authentication payload as described further above to ultimately access premium communication services, for example streaming video, via the short range radio transceiver 152 over the untrusted network.

The scenario of method 350 differs from the method 310 at least in that, in an embodiment, the mobile communication device 102 may initiate the scenario of method 310, for example by sending the request authentication payload message 232 described above with reference to FIG. 5, while in an embodiment, the communication device 150 may initiate the scenario of method 350, for example by sending a request authentication payload message to the authentication server 126 with the mobile directory number of the mobile communication device 102. It is contemplated that user interfaces may be provided by either or both of the mobile communication device 102 or the communication device 150 to initiate the access to the premium communication service via the communication device 150.

Figure 11:
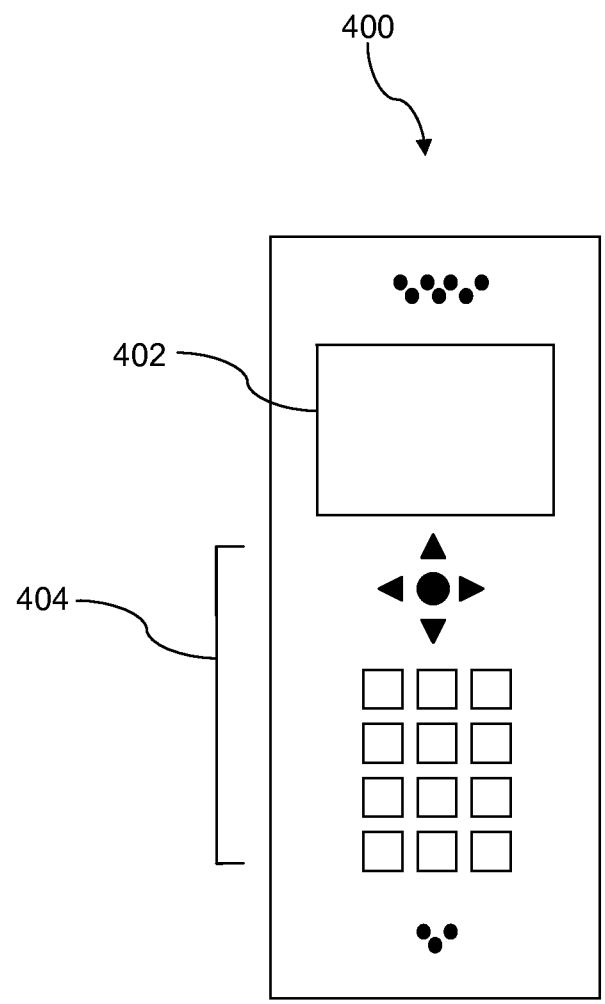
FIG. 11 is an illustration of a mobile communication device according to an embodiment of the disclosure.

FIG. 11 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 12:
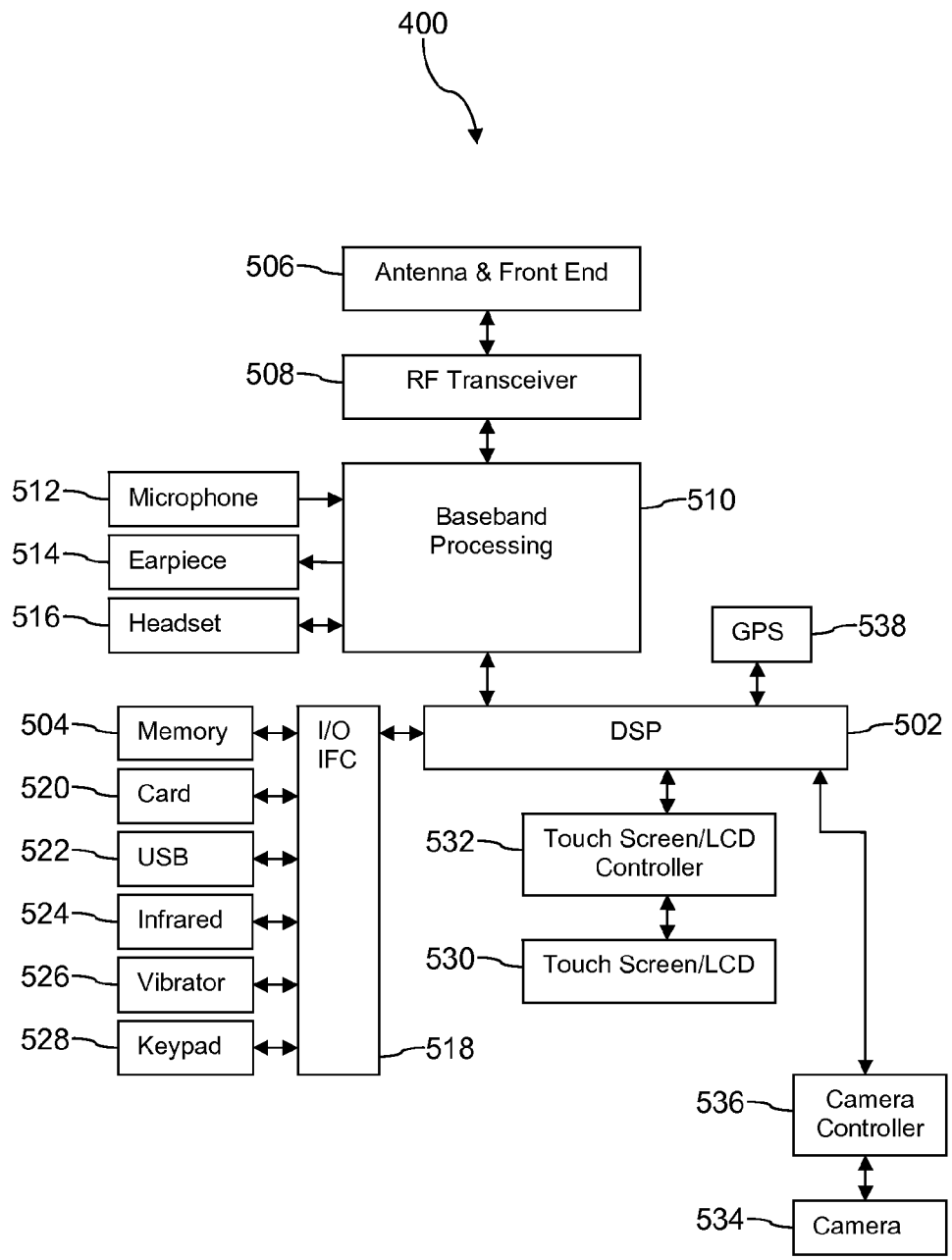
FIG. 12 is a block diagram of a hardware architecture of a mobile communication device according to an embodiment of the disclosure.

FIG. 12 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 13A:
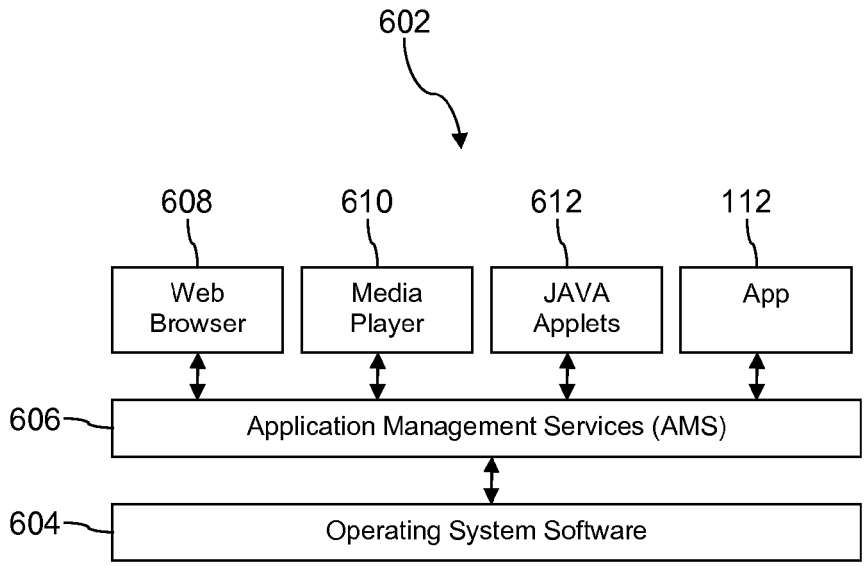
FIG. 13A is a block diagram of a software architecture of a mobile communication device according to an embodiment of the disclosure.

FIG. 13A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 12A are a web browser application 608, a media player application 610, JAVA applets 612, and premium communication service application 112. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The premium communication services application 112 is described further above.

Figure 13B:
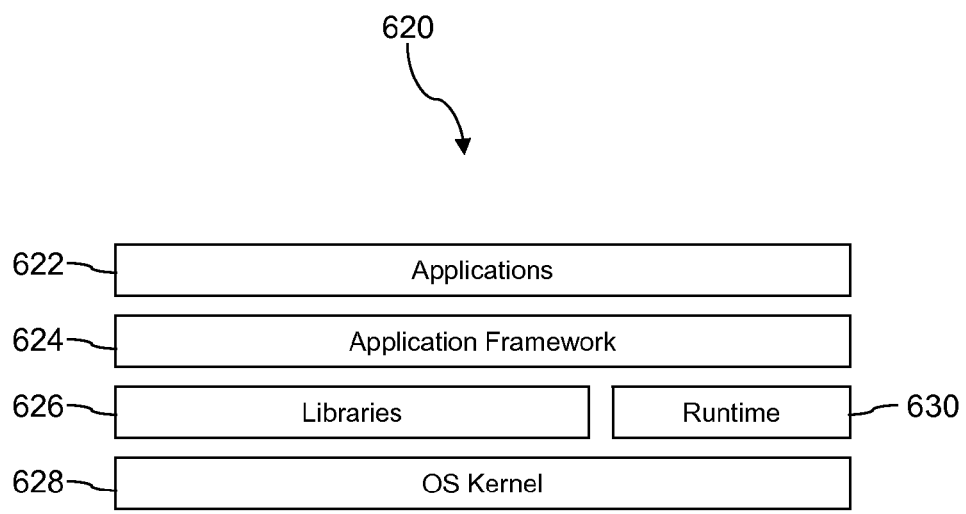
FIG. 13B is a block diagram of a software architecture of a mobile communication device according to an embodiment of the disclosure.

FIG. 13B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 14:
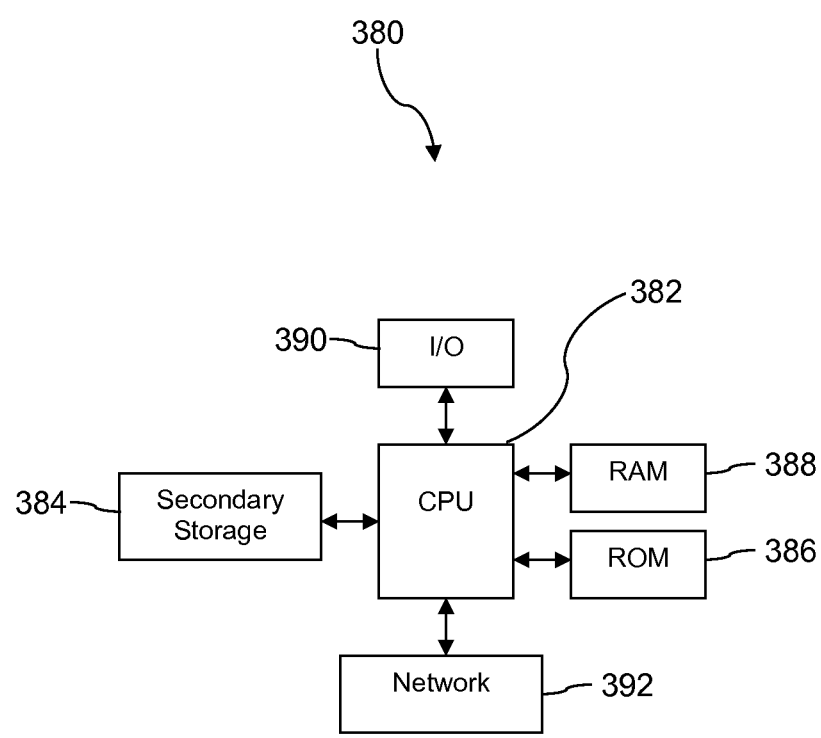
FIG. 14 is a block diagram of a computer system according to an embodiment of the disclosure.

FIG. 14 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating a communication device for accessing premium communication services via an untrusted network, comprising:

receiving, by an authentication server from a mobile communication device via a media gateway, a first authentication request comprising an identification of a premium service and a cellular network access identity of the mobile communication device, wherein receiving the first authentication request occurs over a first network communication path that is provided by a cellular wireless communication service, and wherein the mobile communication device is associated with a subscription to the premium service associated with the cellular wireless communication service;

generating, by the authentication server, a code word based on the cellular network access identity;

storing, in a non-transitory memory coupled to the authentication server, the code word and an authentication payload that is indexed according to the code word, wherein the authentication payload comprises the cellular network access identity of the mobile communication device;

in response to the first authentication request, transmitting, by the authentication server over the first network communication path to the mobile communication device, a first authentication response that comprises the code word;

in response to transmitting the code word to the mobile communication device, receiving, by the authentication server from a communication device via a second network communication path, a second authentication request comprising an identification of the premium service and the code word, wherein the second wireless communication path is over a communication network that does not provide the first network communication path, and wherein the communication device is different from the mobile communication device, and not associated with the subscription to the premium service;

retrieving, by the authentication server, the authentication payload from the non-transitory memory based on the code word from the second authentication request;

based on the code word, transmitting, by the authentication server over the second network communication path to the communication device, a second authentication response that comprises the authentication payload, wherein the authentication payload configures the communication device to access the premium service via the communication network.

2. The method of claim 1, wherein the premium service comprises a video communication service.

3. The method of claim 1, wherein the communication network is accessed via a WiFi communication link.

4. The method of claim 1, wherein the first wireless communication path comprises a cellular wireless communication link.

5. The method of claim 4, wherein the cellular wireless communication link is established according to one of a code division multiple access (CDMA) wireless communication protocol, a global system for mobile communications (GSM) wireless communication protocol, a long-term evolution (LTE) wireless communication protocol, or a worldwide interoperability for microwave access (WiMAX) wireless communication protocol.

6. The method of claim 1, wherein the communication device is one of a laptop computer, a tablet computer, a notebook computer, a television tuner, a television, a mobile device, a gaming system, or any combination thereof.

7. A method of authenticating a communication device for accessing premium communication services via an untrusted network, comprising:

receiving, by an authentication server from a communication device via a first network communication path, a request message from the communication device, wherein the request message comprises an identification of a premium service and a mobile directory number of a mobile communication device, wherein the mobile communication device is different from the communication device, and wherein the communication device does not have a code word or an authentication payload;

transmitting, by the authentication server via a second network communication path that is provided by a cellular wireless communication service, the code word to the mobile communication device that is associated with the mobile directory number, wherein the second network communication path is over a communication network that does not provide the first network communication path;

receiving, by the authentication server via the first network communication path, a second request message from the communication device, wherein the second request message comprises the code word; and sending, by the authentication server from a non-transitory memory via the first network communication path, an authentication payload message, comprising the authentication payload, to the communication device based on the code word of the second request message.

8. The method of claim 7, wherein the first network communication path includes the untrusted network according to the authentication server, and wherein the untrusted network does not provide the second network communication path to the mobile communication device.

9. The method of claim 8, wherein the untrusted network comprises a WiFi communication link between the communication device and a wireless access point along the first network communication path.

10. The method of claim 7, wherein the communication device is one of a laptop computer, a tablet computer, a desktop computer, a media player, a television, a mobile device, a gaming system, or any combination thereof.

11. The method of claim 7, further comprising:
determining, by the authentication server, that the mobile communication device associated with the mobile directory number is provisioned with the premium service.

12. The method of claim 7, wherein the code word comprises a defined parameter, and wherein the defined parameter comprises at least six characters.

13. The method of claim 7, wherein the code word is transmitted to the mobile communication device using a short message service (SMS) message.

14. A communication device, comprising:
a short range radio transceiver configured to communicatively couple to a communication network that is not recognized by a provider of a premium communication service;
a processor;
an input device configured to communicatively couple with the processor;
a non-transitory memory communicatively coupled with the processor; and
an application stored in the non-transitory memory that, upon execution by the processor, configures at least the processor to:
receive, via the input device, an input that initiates access to the premium communication service via the communication network;
in response to the input, request a mobile device number of a mobile communication device, wherein the mobile communication device is associated with a subscription to the premium communication service;
receive the mobile device number based on the request;
build a request message that comprises the mobile device number;
transmit, to an authentication server associated with the premium communication service, the request message via the short range radio transceiver over a first communication path of the communication network;
subsequent to transmission of the request message, receive a code associated with the premium communication service and the mobile communication device, wherein the communication device does not have the code prior to transmission of the request message;

based on reception of the code, forward the code to the authentication server via the short range radio transceiver over the first communication path; and based on forward of the code, receive access to the premium communication service via the short range radio transceiver over the communication network.

15. The communication device of claim 14, wherein the communication device is one of a desktop computer, a laptop computer, a tablet computer, a notebook computer, a media player, a television, a mobile device, a gaming system, or any combination thereof.

16. The communication device of claim 14, wherein the short range radio transceiver comprises a WiFi radio transceiver.

17. The communication device of claim 14, wherein the communication network comprises a wireless communication link between the short range radio transceiver and a wireless access point.

18. The communication device of claim 14, wherein the premium communication service is a streaming video service.

19. The communication device of claim 14, wherein the premium communication service is a stream of supplemental sports content.

20. The communication device of claim 14, further comprising a display device, wherein the processor is further configured to present content received from the premium communication service via the display device.

* * * * *